J. H. DOWNING.
BINDER TRUCK.
APPLICATION FILED OCT. 1, 1917.

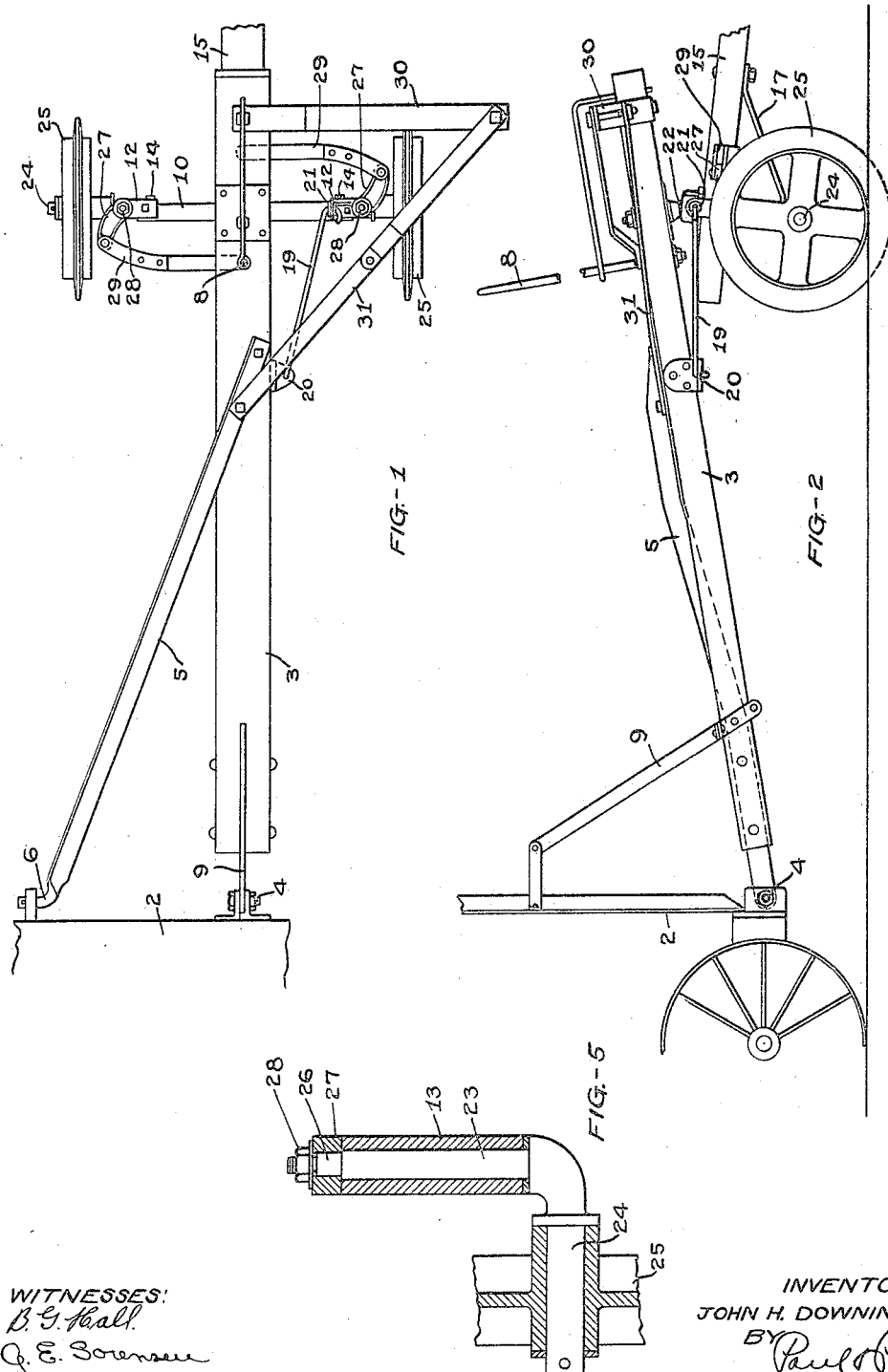

1,281,308.

Patented Oct. 15, 1918.
2 SHEETS—SHEET 2.

WITNESSES:
B. J. Hall
G. E. Sorensen

INVENTOR:
JOHN H. DOWNING.
BY
Paul & Paul
ATTORNEYS.

UNITED STATES PATENT OFFICE.

JOHN H. DOWNING, OF MINNEAPOLIS, MINNESOTA, ASSIGNOR TO THE STATE OF MINNESOTA.

BINDER-TRUCK.

1,281,308.

Specification of Letters Patent.

Patented Oct. 15, 1918.

Application filed October 1, 1917. Serial No. 194,215.

*To all whom it may concern:*

Be it known that I, JOHN H. DOWNING, a subject of the King of England, resident of Minneapolis, county of Hennepin, State of Minnesota, have invented certain new and useful Improvements in Binder-Trucks, of which the following is a specification.

My invention relates to improvements in two-wheeled tongue trucks for harvesters, binders, or other machines and the object of the invention is to provide a truck of strong and durable construction, capable of being turned sharply at right angles, as required in harvesters, to keep the cut corners of the grain square.

A further object is to provide a binder truck in which the axle of the truck is held rigidly against oscillation with respect to the draft hub, while provision is made for oscillating the truck wheels in turning.

Further the invention consists in simplicity of construction and an improved attachment to the stub tongue of a harvester or other machine.

The invention consists generally in various constructions and combinations, all as hereinafter described and particularly pointed out in the claims.

Figure 4:
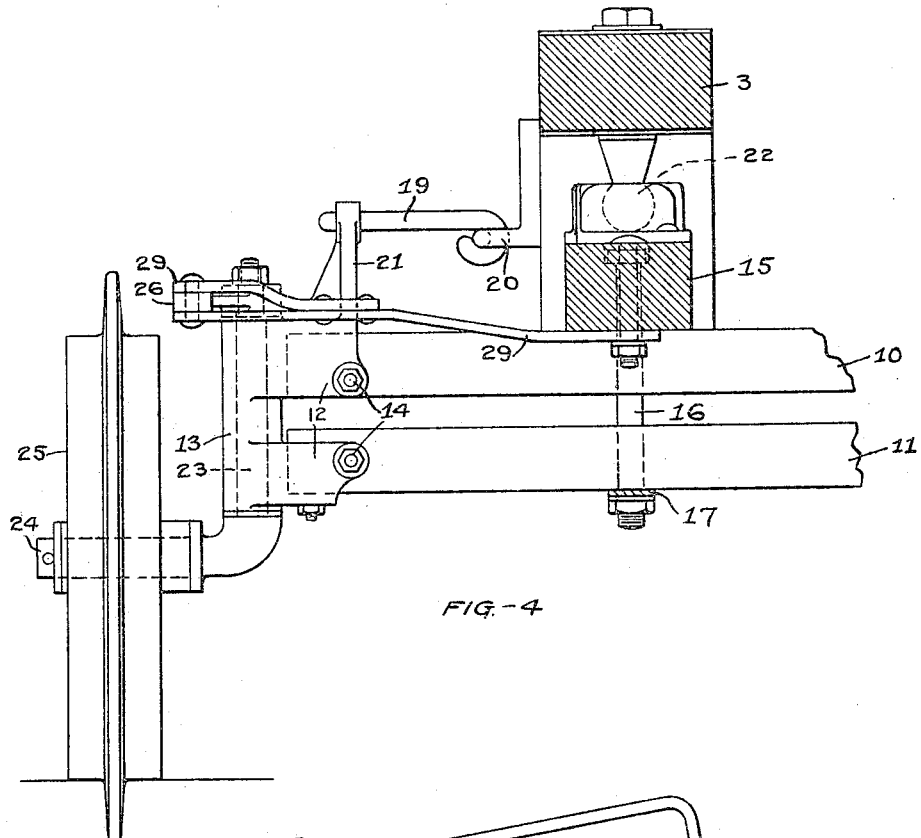
Figure 3:
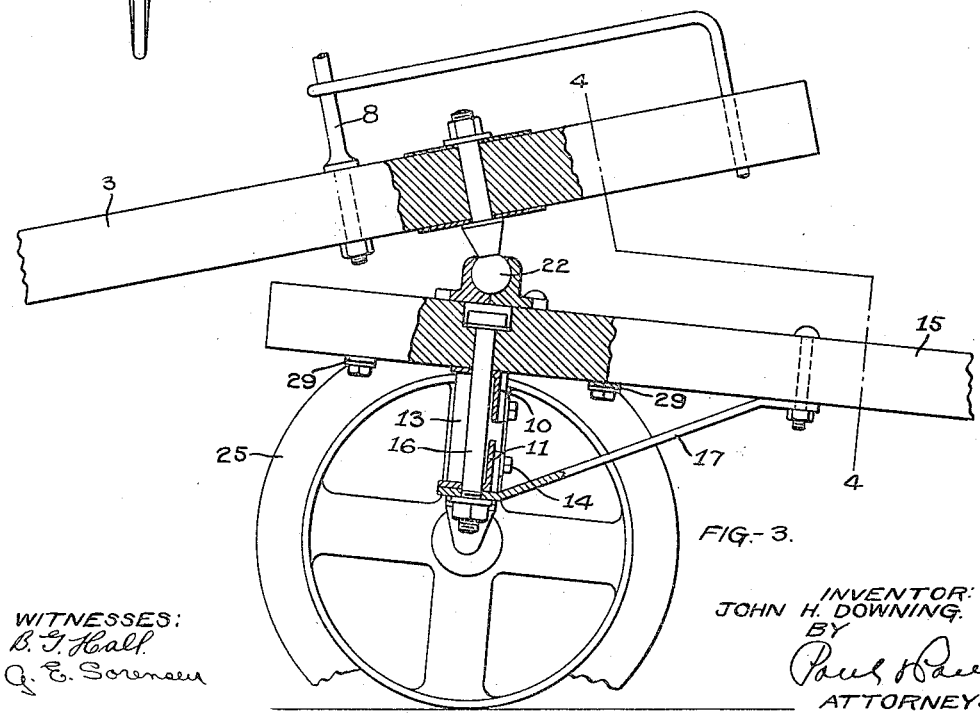

In the accompanying drawings forming part of this specification,

Figure 1 is a plan view of the truck, the stub tongue and a part of a harvester, Fig. 2 is a side elevation of same, Fig. 3 is an enlarged detail sectional view of the truck, Fig. 4 is a sectional view, taken on the line 4—4 of Fig. 3, Fig. 5 is a detail view, showing the stub axle construction.

In the drawing, 2 represents a portion of a harvester frame. 3 is a stub tongue having a pivotal connection at 4 with the frame of the harvester. 5 is a draft connection between the tongue 3 and a point 6 on the harvester frame. 8 represents a line support and 9 is an adjusting means for tilting the front end of the frame. These parts may be of any particular or preferred construction. The axle of the truck is preferably composed of angle bars 10 and 11 arranged one above the other in parallel relation and having their ends secured to lugs 12 on a casting 13 by suitable means, such as bolts 14. 15 is a draft tongue pivotally connected to the truck axle by means of a king bolt 16 passing through holes in the angle irons 10 and 11. A brace bar 17 is bolted at its forward end to the tongue and extends downwardly and rearwardly and has its lower end mounted on the corresponding end of the king bolt. The head of the king bolt is preferably counter-sunk in the tongue, as shown in Fig. 3, and thereby the tongue may be swung or oscillated on the truck axle.

A rod 19 has one end connected at 20 with the stub tongue 3 and its opposite end connected to an arm 21 mounted on the casting 13, thereby holding the truck axle in a position at right angles to the top tongue, preventing it from oscillating independently thereof. The stub tongue is preferably connected to the draft tongue through a ball and socket joint 22, thereby allowing the truck to ride over rough ground without binding or breaking of the parts.

The rod 19, as indicated in Fig. 4, has a pivotal connection with the arm 21 on a plane with the ball and socket, thereby allowing the draft pole to be raised to any height with respect to the ground line without binding the frame and stub tongue. The castings 13 are provided with bearings for upright steering knuckles 23 on spindles 24. Suitable wheels 25 are mounted on these spindles. The upper ends of the knuckles are preferably provided with squared portions 26 and steering arms 27 are secured thereon by means of nuts 28 engaging the threaded outer ends of the knuckles. Arms 29 are secured to the arms 27 and connect the steering arm on one side of the truck in the rear of its axle with the tongue 15, while the corresponding arm on the opposite side of the axle has similar connections with the tongue on that side, as shown plainly in Fig. 3. In this position the oscillation of the draft tongue or pole will move the arm 29 and rock the axle supporting wheels to effect a square or other turn, as may be desired.

The tongue 3 at a point in front of the ball and socket bearing on the draft tongue has a bar 30 extending outwardly at right angles and connected at its outer end by links 31 with the tongue 3 near the forward end of the bar 5. This forms a portion of the draft connection between the tongue and the binder frame. I make no claim to this part of the device, the novelty in my truck consisting in the rigidly mounted axle of the truck and the arms connected in the front and rear of the king bolt with the draft tongue and at their outer ends having a pivotal connection with the wheel spindle arms, thereby oscillating the wheels when the draft tongue is moved back and forth.

I claim as my invention:

1. A binder truck comprising an axle having wheel spindles journaled in upright bearings therein and carrying wheels for said spindles, a draft tongue and a kingbolt connecting it with said axle, bars pivotally connected with said draft tongue in the front and the rear respectively of said king bolt and having crank connections with said wheel spindles, a stub tongue having a swivel bearing on said draft tongue and means for connection with a binder, and means connecting said stub tongue with said axle for locking it against oscillation.

2. A binder tongue truck comprising an axle having wheel spindles journaled in upright bearings therein and wheels for said spindles, a draft tongue and a king bolt connecting it with said axle, bars pivotally connected with said draft tongue in the front and rear respectively of said king bolt and having crank connections with said wheel spindles, a stub tongue having a universal bearing on said draft tongue and means for connection with a binder, and a rigid rod connecting said stub tongue with said axle at one side of said king bolt for locking said axle against oscillation.

3. A binder truck comprising an axle having wheel spindles journaled in upright bearings therein and carrying wheels for said spindles, crank arms mounted on said spindles, one projecting in front of said axle and the other in the rear thereof, a draft tongue and a king bolt connecting it with said axle, bars pivotally connected at their inner ends to said draft tongue in the front and rear respectively of said king bolt, the outer ends of said bars being pivotally connected respectively to said crank arms, whereby when said draft tongue is oscillated said wheels will be simultaneously turned to steer the truck, a stub tongue having a universal bearing on said draft tongue, and means connecting said stub tongue with said axle for locking it against oscillation.

In witness whereof I have hereunto set my hand this 27th day of September, 1917.

JOHN H. DOWNING.

Witnesses:
R. B. McPhetres,
W. G. Nelson.